Sept. 20, 1949.                L. L. WEISGLASS                2,482,604
                     METERING CIRCUIT FOR X-RAY MACHINES
Filed March 22, 1946                                     2 Sheets-Sheet 1

INVENTOR
LOUIS L. WEISGLASS
BY Hyde, Meyer, Baldwin & Doran
ATTORNEYS

Sept. 20, 1949.    L. L. WEISGLASS    2,482,604
METERING CIRCUIT FOR X-RAY MACHINES Filed March 22, 1946    2 Sheets—Sheet 2

INVENTOR
LOUIS L. WEISGLASS
BY Hyde, Meyer, Baldwin & Doran
ATTORNEYS

Patented Sept. 20, 1949

2,482,604

UNITED STATES PATENT OFFICE 2,482,604

METERING CIRCUIT FOR X-RAY MACHINES

Louis L. Weisglass, New York, N. Y., assignor to Picker X-Ray Corporation, Waite Manufacturing Division, Inc., Cleveland, Ohio, a corporation of Ohio Application March 22, 1946, Serial No. 656,211

1 Claim. (Cl. 250—101)

This invention relates to improvements in means for measuring the true tube current flowing in an X-ray tube.

The present invention relates to an X-ray tube energized through a transformer and rectifying circuit in the usual manner. The transformer has a split secondary, and the present invention contemplates the use of a mechanical rectifier in the grounded central secondary transformer circuit which provides switching means for permitting the rectified current to flow in a half cycle in-phase with the current flow to the X-ray tube, thus taking advantage of the fact that the capacity current leads the tube current by ninety degrees, and the positive and negative components of the capacity current may be caused to cancel each other, making it possible to obtain a correct measuring of the tube current.

Other objects and advantages of the present invention will be apparent from the accompanying drawings and description, and the essential features thereof will be set forth in the appended claim.

In the drawings,

Fig. 2 is a diagram illustrating the relationship of the X-ray tube load current and the capacity current during a measuring cycle; while

Figure 1:
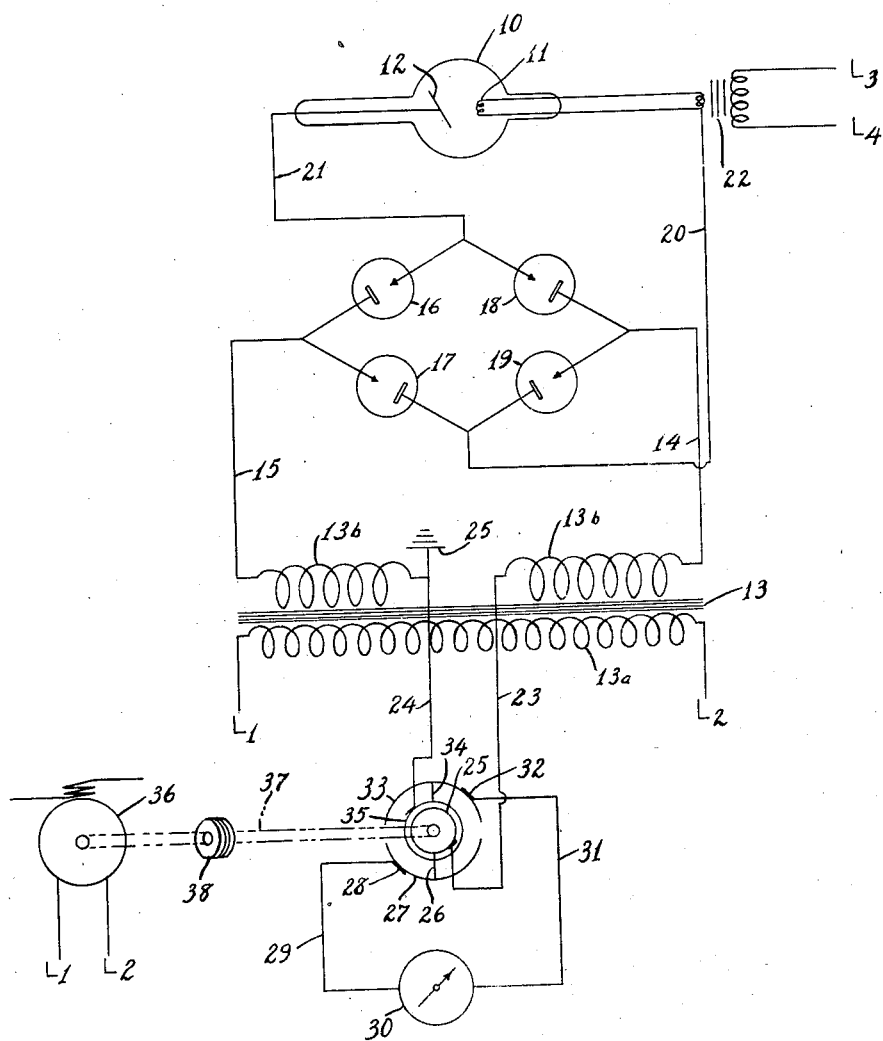
Fig. 1 is a diagrammatic view illustrating one form of my invention utilizing a mechanical rectifier of the rotary type.

My invention is disclosed in connection with an X-ray tube 10 having a filament 11 and an anode 12. The tube is supplied in the usual manner from an alternating current electrical source L1, L2 connected to the primary 13a of a transformer 13. The secondary of the transformer 13b is connected by leads 14 and 15 to a rectifying bridge circuit which includes the rectifier tubes 16, 17, 18 and 19. The rectified current is fed to the tube through the leads 20 and 21. The filament 11 may be heated in a known manner through transformer 22 supplied with current from the source L3, L4. Those familiar with this type of equipment will understand that means is provided for varying the current at the source L1, L2 as by means of a step autotransformer which it is not necessary to show here.

As modern X-ray machines are built entirely shockproof, that is, with all leads carrying high tension being heavily insulated, a milliammeter for reading the current supplied to the tube is generally inserted at a grounded point of the circuit.

The secondary winding 13b of the high tension transformer is therefore split at the center, as indicated by the leads 23 and 24. The lead 24 is shown grounded at 25. In a known manner of measuring the tube load, a milliammeter of the A. C. or rectified D. C. type is commonly connected between the leads 23 and 24. A meter, as so located in the prior art, indicates not only the actual tube current (transformer in-phase load) but also reads leakage currents and capacity currents. The existence of capacity between the high tension coils and ground is unavoidable. These capacity currents are of substantially the same magnitude as the X-ray tube load currents, and therefore, greatly distort the measurement of actual tube load current at this point. Attempts have been made in the past to use compensation currents to diminish or eliminate this undesirable error. The present invention provides another solution departing from the principle of compensation.

Referring to Fig. 1, the lead 23 communicates by means of a suitable brush with the slip ring 25 of a mechanical rectifier of the rotary type. This ring in turn is connected by lead 26 to a half slip ring 27. Brush 28, shown in contact with the half ring, is connected by lead 29 to a meter 30 which may be a conventional D. C. moving coil meter with a linear scale. The other lead from the meter 31 communicates through brush 32 with half ring 33 which in turn is connected by lead 34 to slip ring 35 which, by means of a suitable brush, communicates with lead 24. The rectifier is rotated by means of synchronous motor 36, a shaft connection 37 being indicated diagrammatically in dot-dash lines. The motor 36 is supplied from the source L1, L2, the same source as is connected to the transformer primary 13a. Means is provided for adjusting the phase angle of the rectifier with respect to the phase angle of the X-ray tube current. The means here shown comprises a friction type clutch 38.

Figure 2:
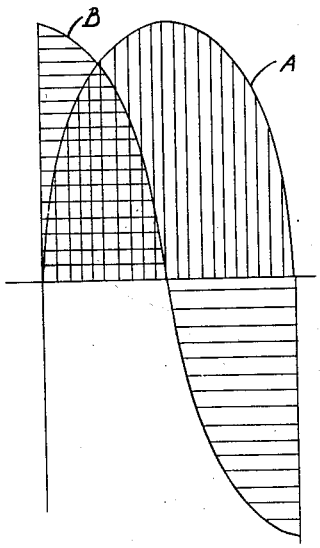

The action of this rectification in the central secondary circuit of the transformer is diagrammatically illustrated in Fig. 2. It should be understood that a mechanical rectifier acts as a contact closer for a controlled time, thereby permitting the flow of current for an exact half wave period. When the phase angle is properly adjusted, the X-ray tube load current during the half cycle of contact of the half rings 27 and 33 will be as indicated in the curve A of Fig. 2, and the integrated value of this current is indicated by the area shaded by vertical lines. It is a well known fact that the capacity current is ninety degrees out of phase with the tube load current indicated at A and leads the latter during the half cycle measured. This capacity current is indicated by the curve B, Fig. 2, and its integrated value is indicated by the areas shaded with horizontal lines. Obviously, during this half cycle, this capacity current has equal integrated areas, plus and minus, therefore the resultant integrated value of the capacity current is zero. This leaves only the X-ray tube load current in-phase as shown by the area beneath the curve A as flowing in the circuit 29, 30, 31. It is true that slight leakage currents may be flowing in this circuit also, but their value is sufficiently small to be negligible.

While I have shown the ammeter 30 as providing some use for the current flowing in the mechanically rectified circuit 29, 30, 31, it should be understood that is merely for purposes of illustration. Obviously, the means 30 may be used merely to indicate the true load current so that it may be read by an operator. It is equally obvious, however, that the current flowing in the circuit 29, 30, 31 may be utilized for any control purpose desired and I do not wish to be limited in the application of my invention to the use of this current merely to operate an indicating device.

Figure 3:
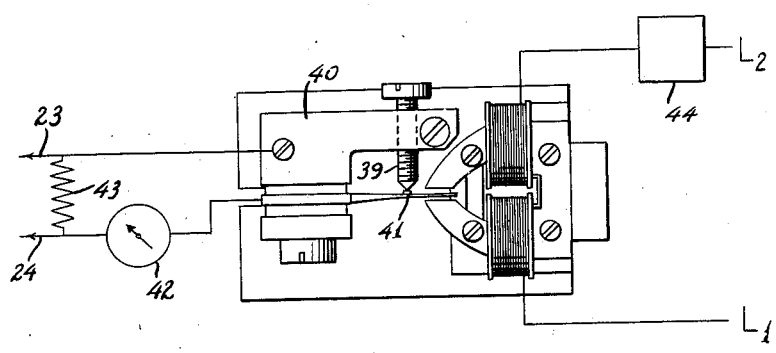
Fig. 3 illustrates a modification of my invention in which a vibratory rectifier is used.

In the modification shown in Fig. 3 I have illustrated somewhat diagrammatically the use of a mechanical rectifier of the vibratory type in place of the rotary rectifier first described. It should be understood that this modification is utilized in connection with the transformer 13 supplied from source L1, L2, the tube rectifier, the X-ray tube 10, and all of its operating circuits, as described in connection with the first modification, down to and including the split secondary circuit of the transformer 23, 24 grounded at 25. In other words, Fig. 3 merely indicates another type of mechanical rectifier which may be inserted in the circuit between the leads 23 and 24.

Obviously, any suitable vibratory rectifier might be used, but I have illustrated the rectifier of Hans Pfannenmuller as disclosed in United States Patent 1,931,267, granted October 17, 1933. It is sufficient to state here that the fixed contact 39 is elecrically connected through the bracket 40 with the lead 23. The movable contact 41 is connected with the lead 24 through meter 42. The shunt resistor 43 is connected between the leads 23 and 24. The vibrator is energized from the source L1, L2 which is the same source as is connected to the transformer primary 13a. A phaseshift unit 44 permits the establishment of the proper phase relation between the actual switching period of the contacts 39, 41 and the X-ray tube current.

When the phase has been properly adjusted in the device of Fig. 3, the contacts 39 and 41 will be closed for a half wave cycle giving the currents A and B as described previously in connection with Fig. 2. During the next half wave period the contacts 39, 41 will be open. This action alternates continuously. It is obvious that the capacity current B again cancels itself out, and the current A will be read on the meter 42 or may be utilized for a control device, if desired, as previously explained.

In the form of my device shown in Fig. 3, only half of the current is flowing through the meter 42 because only every other half wave is connected through the rectifier unit, therefore, if the meter 42 is to read full current it will have to be properly calibrated.

What I claim is:

In the combination of an X-ray tube having an anode and a cathode, a transformer having a primary adapted to be connected with a source of alternating electric current, tube rectifiers, said transformer having a secondary connected with said rectifiers, said rectifiers having a Wheatstone bridge connection with said anode and cathode to supply rectified current thereto, said secondary being split to provide a central secondary circuit, said circuit being grounded; the improvement consisting of a milliammeter in said central secondary circuit, a half wave rectifier of the polarized vibratory type in said central secondary circuit in series with said milliammeter, said vibratory rectifiers having a pair of contacts, a shunt resistor in said central secondary circuit bypassing said contacts and said milliammeter, an electrical energizing circuit for said vibratory rectifier, phase shift means in said energizing circuit for said vibratory rectifier synchronizing the closing cycle of its contacts relative to the phase of the X-ray tube load so that said contacts close said central secondary circuit during one exact half cycle through said milliammeter and so that said contacts are open during the other half cycle, whereby current in said central secondary circuit then bypasses said contacts and said milliammeter through said shunt resistor, whereby one-half of the true X-ray tube current is registered by said milliammeter and the capacity component of the current in said central secondary circuit is balanced out.

LOUIS L. WEISGLASS.

REFERENCES CITED

The following references are of record in the file of this patent:

UNITED STATES PATENTS

| Number | Name | Date |
|---|---|---|
| 1,430,096 | Meyer | Sept. 26, 1922 |
| 1,931,267 | Pfannenmuller | Oct. 17, 1933 |
| 2,189,894 | Goldfield et al. | Feb. 13, 1940 |
| 2,322,404 | Weisglass | June 22, 1943 |